United States Patent Office 3,780,077
Patented Dec. 18, 1973

3,780,077
PROCESS FOR PREPARING LEAD (IV)-ACETATE
Werner Schwarze, Frankfurt, and Wolfgang Weigert, Offenbach, Germany, assignors to Deutsche Gold- und Silber-Scheideanstalt vormals Roessler, Frankfurt am Main, Germany
No Drawing. Filed July 14, 1971, Ser. No. 162,682
Claims priority, application Germany, July 17, 1970,
P 20 35 559.3
Int. Cl. C07f 7/24
U.S. Cl. 260—436                 10 Claims

ABSTRACT OF THE DISCLOSURE

Process for preparing lead (IV)-acetate by oxidizing lead (II)-acetate in the presence of cobalt ions, manganese ions or mixtures of cobalt and manganese ions wherein the improvement consists essentially of reacting the lead (II)-acetate with about 10–40% peracetic acid by weight at a temperateure below about 110° C. to form lead (IV)-acetate. The lead (IV)-acetate is useful for oxidizing certain organic chemicals.

---

This invention relates to an improved process for preparing lead (IV)-acetate.

Lead (IV)-acetate is frequently used as an oxidizing agent in organic chemistry, especially in the case of diol cleavage Angewandte Chemie, 53, 321–326 and 70, 173–179). Its production is accomplished, for example, by conversion of lead (II, IV)-oxide ($Pb_3O_4$) with glacial acetic acid, whereby, only the third part of the lead used is utilized (Dimroth Collaborators, Berichte, 56, p. 1375 [1923]). An improvement in the yield can be achieved if lead (II, IV)-oxide is reacted simultaneously with chlorine in the presence of the glacial acetic acid. However, it is disadvantageous in this case that the lead chloride which forms must be very carefully separated, and it is troublesome if one is to obtain a lead (IV)-acetate relatively free of chlorine (Am. Soc., 61, 972 [1939]).

It also has been known to oxidize lead (II)-acetate with ozone in the presence of cobalt and manganese ions to lead (IV)-acetate. However, according to this process, yields higher than about 72% are not obtained. In practice, the process could not gain ground because very large ozonizers are needed for its execution since one must operate with a very considerable dilution, and because the yields, related to the ozone, are very low (Canadian Journal of Chemistry, 42, 974–976 [1964]).

According to the invention there is provided a process for preparing lead (IV)-acetate in the presence of cobalt ions, manganese ions or mixtures of cobalt and manganese ions wherein the improvement consists essentially of reacting the lead (II)-acetate with about 10–40% peracetic acid by weight at a temperature below about 110° C. to form lead (IV)-acetate. According to this process, lead (IV)-acetate is obtained at high yields and great purity.

Preferably, the conversion is accomplished in the presence of a solvent or dispersing agent, which is inert vis-a-vis peracetic acid. Examples of this are glacial acetic acid ester, especially acetic ester, ethyl acetate, n-propyl acetate, n-butyl acetate, t-butyl acetate and benzene.

The use of a solvent or dispersing agent is not always necessary. If peracetic acid is used, and to this is added the lead (II)-acetate in solid form, the use of an additional solvent is not required. The acetic acid which forms from the peracetic acid takes over the function of a solvent in this case. However, working in the presence of a solvent or dispersing agent is preferred.

One can start out from a crystal water containing lead (II)-acetate as well as an anhydrous salt. The highest yields of leads will be obtained if there is less than about 10% water by weight present at the end of the reaction. Percent water is based on the water, solvents and reactants present at the end of the reaction. In the case of higher water content, the yields decrease. Preferably, anhydrous peracetic acid is used with glacial acetic acid as a solvent or dispersing agent.

The reaction is carried out in the presence of cobalt or manganese ions, which may have any desired valence, since no reaction will occur in the absence of these ions. Mixtures of these ions can also be used. These preferably are added in the form of their carboxylic acid salts, especially their acetates. However, other salts can be used for these purposes. Preferably, about 0.01 to about 0.1 mole of cobalt and/or manganese (II)-salt are to be present per mole of lead (II)-acetate. In the interest of as rapid as possible a course of oxidation, quantities below the ones stated should be avoided.

Larger quantities of cobalt or manganese salts can be used. In this case high yields will be obtained if one operates with an excess of peracetic acid. The larger quantities of cobalt or manganese salt decompose a part of the peracetic acid. However, it also is possible to use smaller quantities, but in this case the reaction must be carried out over a longer period of time. One will then arrive at the same results. For example, in the case of the method of operation according to Example 1, one must react for about 24 hours if one uses only 2.28 g. instead of 11.4 g. cobalt acetate per mole lead (II)-acetate.

Besides the acetates of cobalt and manganese, also preferred are the sulfates, propionates, butyrates, pelargonates and the acetylacetonates. Furthermore, it is possible to use the chlorides. In this case however, consideration should be given to the fact that the end product will be contaminated with small quantities of chlorine, which however is insignificant for many applications.

The oxidation reaction is carried out at a temperature below about 110° C., preferably about 10° C. to about 110° C. It is particularly preferred that the reaction be conducted at a temperature of about 30° C. to about 60° C. Temperatures below 10° C. can be used; however, lower space-time yields are obtained. If however one operates in glacial acetic acid, then one cannot maintain any lower temperatures because then the glacial acetic acid becomes a solid. In that case however one still can add a second inert solvent which is miscible with glacial acetic acid.

It is preferred to use the lead (II)-acetate and peracetic acid in a molar ratio of about 1:2. About 10–40% of peracetic acid by weight should be used, and preferably about 20–30% by weight based on the total reaction mixture. The peracetic acid is preferably practically anhydrous; however, small amounts of water, e.g. less than about 5% by weight can be tolerated.

When adhering to the above mentioned conditions, the reaction occurs spontaneously. The lead (IV)-acetate formed, can be precipitated from the solution and can be isolated by filtration. Other means of separating the lead (IV)-acetate will be obvious to one skilled in the art. Further quantities can be obtained from the remaining solution by evaporation. The crude salt after recrystallization, for example from glacial acetic acid, can be converted into the analytically pure form. The yields lie between 80 and 90%, and are clearly higher than yields achieved according to heretofore known processes.

EXAMPLE 1

380 g. lead (II)-acetate [$Pb(OCOCH_3)_2+3H_2O$] is suspended in 1.5 liters glacial acetic acid and 11.4 g. cobalt (II)-acetate [$Co(OCOCH_3)_2+4H_2O$] is added. Now 700 g. of a 25.3% peracetic acid, dissolved in n-propyl acetate, are added drop by drop while stirring vigorously. The temperature quickly rises and the solution takes on a dark green color. Care is taken by way of outside cooling that the temperature in the flask does not exceed 60° C.

After two hours the reaction is completed. It is cooled to 15° C. and the lead (IV)-acetate formed is drawn off by suction. The mother lye is concentrated at 100 mm. Hg vacuum, at the same time another lead (IV)-acetate is precipitated, which is drawn off by suction. The two fractions are recrystallized from glacial acetic acid and are dried in the vacuum over $H_2SO_4$. White crystals with a melting point of 176° C. are obtained. The yield amounts to 390.6 g., corresponding to 88.1% of theoretical.

Purity: 99.4% (titration with KI/Na-thiosulfate).

EXAMPLE 2

Proceeding as in Example 1, however using 380 g. lead (II)-acetate ($+3H_2O$) and 10 g. manganese (II)-acetate. The yield of lead (IV)-acetate amounts to 361.3 g., corresponding to 81.5% of theory.

What is claimed is:

1. Process for preparing lead (IV)-acetate by oxidizing lead (II)-acetate in the presence of cobalt ions, manganese ions or mixtures of cobalt and manganese ions wherein the improvement consists essentially of reacting the lead (II)-acetate with about 10–40% peracetic acid by weight at a temperature below about 110° C. to form lead (IV)-acetate.

2. Process according to claim 1 in which the lead (II)-acetate and peracetic acid are in a molar ratio of 1:2.

3. Process according to claim 1 in which the peracetic acid is about 20–30% by weight.

4. Process according to claim 1 consisting essentially of oxidizing the lead (II)-acetate at about 10–110° C.

5. Process according to claim 1 consisting essentially of oxidizing the lead (II)-acetate at about 30°–60° C.

6. Process according to claim 1 consisting essentially of oxidizing the lead (II)-acetate in the presence of acetates of cobalt, manganese or mixtures thereof.

7. Process according to claim 6 in which about 0.01–0.1 mole of cobalt acetate, manganese (II)-acetate or mixtures thereof is used per mole of lead (II)-acetate.

8. Process according to claim 7 in which lead (II)-acetate and peracetic acid are in a molar ratio of 1:2.

9. Process according to claim 8 in which the peracetic acid is about 20–30% by weight.

10. Process according to claim 9 consisting essentially of oxidizing the lead (II)-acetate at about 30°–60° C.

References Cited

UNITED STATES PATENTS

| | | | |
|---|---|---|---|
| 3,361,741 | 1/1968 | Shulman | 260—436 X |
| 3,649,662 | 3/1972 | Wirth et al. | 260—436 X |
| 2,857,434 | 10/1958 | Patton | 260—436 X |
| 2,790,824 | 4/1957 | Daidone | 260—436 X |

HELEN M. S. SNEAD, Primary Examiner